US010340766B2

(12) United States Patent
Wei

(10) Patent No.: US 10,340,766 B2
(45) Date of Patent: Jul. 2, 2019

(54) WATERPROOF STABILIZER AND WATERPROOFING METHOD THEREOF

(71) Applicant: Chengyun Wei, Guangxi (CN)

(72) Inventor: Chengyun Wei, Guangxi (CN)

( * ) Notice: Subject to any disclaimer, the term of this patent is extended or adjusted under 35 U.S.C. 154(b) by 73 days.

(21) Appl. No.: 15/838,391

(22) Filed: Dec. 12, 2017

(65) Prior Publication Data

US 2018/0323675 A1    Nov. 8, 2018

(30) Foreign Application Priority Data

May 2, 2017  (CN) .......................... 2017 1 0301521

(51) Int. Cl.
| | |
|---|---|
| *H02K 5/10* | (2006.01) |
| *H02K 11/00* | (2016.01) |
| *H02K 11/30* | (2016.01) |
| *H02K 11/33* | (2016.01) |

(52) U.S. Cl.
CPC ........... *H02K 5/10* (2013.01); *H02K 11/0094* (2013.01); *H02K 11/30* (2016.01); *H02K 11/33* (2016.01)

(58) Field of Classification Search
CPC ...... H02K 5/10; H02K 11/33; H02K 11/0094; H02K 11/30
USPC ............................................. 310/67 R, 112
See application file for complete search history.

(56) References Cited

U.S. PATENT DOCUMENTS

| | | | | |
|---|---|---|---|---|
| 9,894,278 | B2 * | 2/2018 | Wei | G03B 17/561 |
| 9,903,533 | B2 * | 2/2018 | Wei | F16M 11/12 |
| 10,156,776 | B1 * | 12/2018 | Wei | G03B 17/561 |
| 10,164,497 | B2 * | 12/2018 | Johnson | H02K 5/10 |
| 10,240,714 | B2 * | 3/2019 | Wei | F16M 11/123 |
| 2016/0036301 | A1 * | 2/2016 | Tominaga | H02K 11/001 310/68 B |
| 2016/0164381 | A1 * | 6/2016 | Johnson | H02K 5/10 301/6.1 |
| 2018/0283601 | A1 * | 10/2018 | Wei | F16M 11/041 |
| 2018/0323675 | A1 * | 11/2018 | Wei | H02K 5/10 |

* cited by examiner

*Primary Examiner* — John K Kim

(57) ABSTRACT

The present invention discloses a waterproof stabilizer and a waterproofing method thereof. The stabilizer comprises a fixing assembly, a rotating assembly, circuit boards and a waterproof assembly, wherein the rotating assembly comprises a first motor, a second motor, a third motor, a first connecting arm and a second connecting arm, wherein the first motor, the second motor and the third motor are orthogonally arranged in space, and are connected to the circuit board via a connecting base, wherein the waterproof assembly comprises sealing rings and waterproof plugs respectively arranged between the structural members and the connectors of the stabilizer, waterproof layers arranged on the circuit board, and a waterproof membrane arranged on the connecting base, thereby providing better sealing performance for the waterproof stabilizer, enabling the waterproof stabilizer to be water proof and to be applicable to wet or watery environment.

10 Claims, 3 Drawing Sheets

WATERPROOF STABILIZER AND WATERPROOFING METHOD THEREOF

CROSS-REFERENCE TO PRIOR APPLICATION

This application claims the benefit of Chinese Patent Application No. 201710301521.4 filed on May 2, 2017, the contents of which are incorporated herein by reference.

FIELD OF THE INVENTION

The present invention relates to a stabilizer, more particularly to a waterproof stabilizer and a waterproofing method thereof.

BACKGROUND OF THE INVENTION

The stabilizer is used for fixing a target object and adjusting its position, e.g. controlling its direction and its rolling and pitching angles, and for stabilizing it at a determined position, so as to achieve a stable and smooth multi-angle shooting. Usually, the target objects include video cameras, photo cameras, etc. Now, most stabilizers are handheld or onboard pan-tilts. The sport fans usually attach these stabilizers to bicycles, helmets or their wrists and so on, and use them together with cameras to perform shooting at various places. However, existing stabilizers are not waterproof and may be damaged upon exposure to water or under wet conditions. Hence, the existing stabilizers are limited to use in some circumstances, which causes inconvenience.

SUMMARY OF THE INVENTION

The present invention aims to provide a waterproof stabilizer and a waterproofing method thereof to solve the problem of the stabilizers which are prone to damage upon exposure to water, and enable the stabilizer to be applicable to special situations such as wet or watery environment, together with cameras.

In order to achieve the above goal, the present invention provides a waterproof stabilizer, comprising a fixing assembly, a rotating assembly, circuit boards and a waterproof assembly, wherein the rotating assembly comprises a first motor, a second motor, a third motor, a first connecting arm and a second connecting arm, wherein the first motor, the second motor and the third motor are orthogonally arranged in space, a rotor of the first motor is connected with the fixing assembly, a stator of the first motor is fixedly connected with a rotor of the second motor via the first connecting arm, a stator of the second motor is fixedly connected with a rotor of the third motor via the second connecting arm, and the first motor, the second motor and the third motor are respectively connected to the circuit board via a connecting base;

A first protective case and a first protective cover are arranged on the outside of the first motor, a side wall of the first protective case is connected to the first connecting arm, and the first protective cover is covered on the first protective case. A second protective case and a second protective cover are arranged on the outside of the second motor, a side wall of the second protective case is connected to the second connecting arm, and the second protective cover is covered on the second protective case;

A waterproof assembly comprises a first sealing ring, a second sealing ring, a third sealing ring, a fourth sealing ring, a first waterproof plug, a second waterproof plug, a third waterproof plug, a first waterproof layer, a second waterproof layer, a third waterproof layer, and a waterproof membrane;

The first sealing ring is arranged between the fixing assembly and the rotor of the first motor;

The second sealing ring is arranged between the first protective case and the first protective cover;

The third sealing ring is sleeved on a shaft of the second motor;

The fourth sealing ring is arranged between the second protective case and the second protective cover;

The first waterproof plug is arranged between the side wall of the first protective case and the first connecting arm;

The second waterproof plug is arranged between the side wall of the second protective case and the second connecting arm;

The third waterproof plug is arranged at an end of a shaft of the third motor, and a shaft hole of the third motor is plugged by the third waterproof plug;

The first waterproof layer is arranged on a surface of the circuit board, the second waterproof layer is covered on the first waterproof layer, and the third waterproof layer is covered on the second waterproof layer; and The waterproof membrane is covered on a surface of the connecting base.

In a preferred embodiment, the waterproof stabilizer may further comprise a base portion, and the stator of the third motor is connected to an upper end of the base portion, wherein the base portion comprises a casing and a cover plate covered on the casing. A USB interface and an indicator light are arranged on a surface of the casing. The waterproof assembly further comprises a fifth sealing ring, a fourth waterproof plug, a casing waterproof membrane and a casing waterproof layer, wherein the fifth sealing ring is arranged between the casing and the cover plate, the fourth waterproof plug is connected to a surface of the casing and is covered on the USB interface, the casing waterproof membrane is connected to the casing and covered on the indicator light, and the casing waterproof layer is attached to an outer wall of the cover plate.

In a preferred embodiment, the first connecting arm may be provided with a sliding groove at the end connected with the rotor of the second motor, a connecting part is arranged on the rotor of the second motor, the rotor of the second motor is slidably connected to the sliding groove via the connecting part, and a fastener is arranged on the connecting part and for fixing the position of the second motor relative to the first connecting arm.

In a preferred embodiment, the fastener may be a rotating knob externally sleeved on the connecting part.

In a preferred embodiment, the fixing assembly may comprise a fixing plate, a fixing strip and a locking screw, wherein the fixing plate is provided at an upper end and a lower end with a groove for receiving an object, and the fixing plate is provided at the upper end and the lower end with a through hole, and the fixing strip is provided at an upper end and a lower end with a threaded hole corresponding to the through hole. The object may be fixed between the fixing plate and the fixing strip by means of the locking screw sequentially extending through the through hole and the threaded hole.

In a preferred embodiment, the first sealing ring, the second sealing ring, the third sealing ring, the fourth sealing ring, the fifth sealing ring, the first waterproof plug, the second waterproof plug, the third waterproof plug, and the fourth waterproof plug may be made of soft materials.

In a preferred embodiment, the sealing rings may be O-shaped.

In a preferred embodiment, the waterproof membrane may be made of transparent materials.

A waterproofing method of a waterproof stabilizer comprises steps as follows.

Immersing the circuit board in a first lacquer for ten minutes, then drying the circuit board for five hours, to form a first waterproof layer on a surface of the circuit board;

Coating a surface of the first waterproof layer with three-proofing lacquer, to form a second waterproof layer;

Coating a surface of the second waterproof layer with the first lacquer, to form a third waterproof layer;

Connecting the first motor, the second motor and the third motor with the circuit board via the connecting base, respectively, and meanwhile coating a surface of the connecting base with a second lacquer, to form a waterproof membrane covered on the surface of the connecting base.

In a preferred embodiment, the first lacquer may be thick, and an oil film may be formed when the first lacquer is not cured, and the second lacquer may be made of transparent liquid materials, and it forms a water-resistant thin film after being cured.

In the waterproof stabilizer according to the present invention, the first motor, the second motor and the third motor are orthogonally arranged in space, the rotor of the first motor is connected with the fixing assembly, the first connecting arm has one end connected with the stator of the first motor and the other end connected with the rotor of the second motor, the second connecting arm has one end connected with the stator of the second motor and the other end connected with the rotor of the third motor, and the first motor, the second motor and the third motor are respectively connected to the circuit board via a connecting base. Herein, the first protective case and the first protective cover are arranged on the outside of the first motor, and the second protective case and the second protective cover are arranged on the outside of the second motor. The first sealing ring is arranged between the fixing assembly and the rotor of the first motor, the second sealing ring is arranged between the first protective case and the first protective cover, the third sealing ring is sleeved on the shaft of the second motor, the fourth sealing ring is arranged between the second protective case and the second protective cover, the first waterproof plug is arranged between the first protective case and the first connecting arm, the second waterproof plug is arranged between the second protective case and the second connecting arm, the third waterproof plug is arranged at one end of the shaft of the third motor, and the shaft hole of the third motor is plugged by the third waterproof plug. The first waterproof layer, the second waterproof layer and the third waterproof layer are sequentially arranged on the surface of the circuit board, and the waterproof membrane is arranged on the surface of the connecting base, whereby the structural members and connectors of the waterproof stabilizer have better sealing performance and the circuit parts of the waterproof stabilizer have improved water proof function, such that the waterproof stabilizer can be water proof and can be applicable to wet or watery environment.

Herein: 1. fixing assembly; 11. fixing plate; 111. cavity; 12. fixing strip; 13. locking screw; 2. rotating assembly; 21. first motor; 211. first protective case; 212. first protective cover; 22. second motor; 221. second protective case; 222. second protective cover; 223. connecting part; 2231. fastener; 23. third motor; 24. first connecting arm; 25. second connecting arm; 3. waterproof assembly; 31. first sealing ring; 32. second sealing ring; 33. third sealing ring; 34. fourth sealing ring; 35. fifth sealing ring; 36. first sealing plug; 37. second sealing plug; 38. third sealing plug; 39. fourth sealing plug; 310. casing waterproof membrane; 311. casing waterproof layer; 4. base portion; 41. USB interface; 42. indicator light; 43. key interface; 44. first mounting portion; 45. second mounting portion; 46. casing; 47. cover plate.

DETAILED DESCRIPTION OF ILLUSTRATED EMBODIMENTS

The present invention will be further explained below in detail with reference to figures and particular embodiments. Those embodiments are intended to be illustrative rather than limiting.

Figure 1:
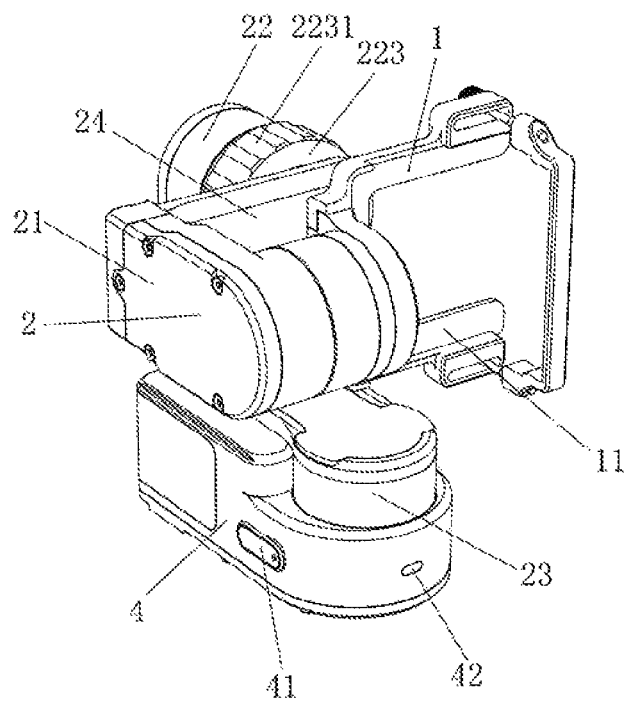
FIG. 1 is a first schematic drawing of a waterproof stabilizer according to an embodiment of the present invention.
Figure 2:
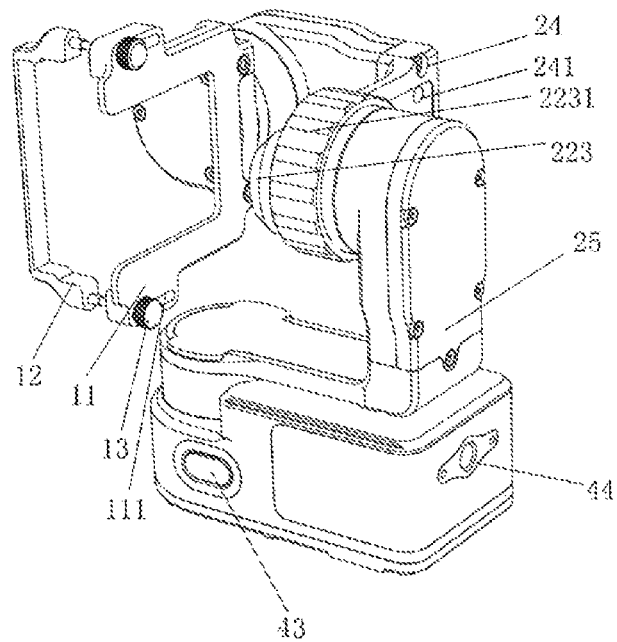
FIG. 2 is a second schematic drawing of an embodiment of the present invention.
Figure 4:
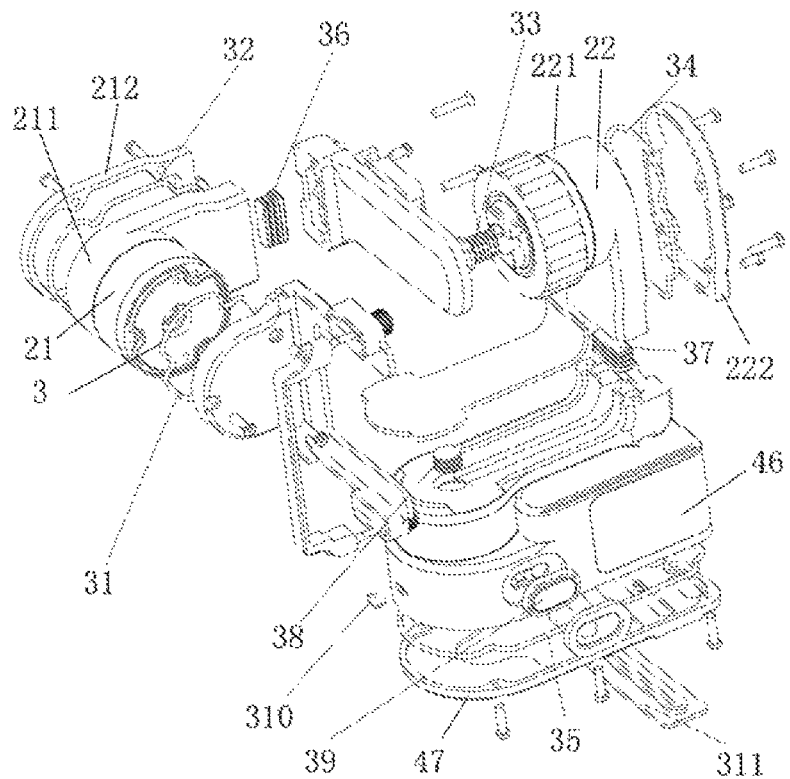
FIG. 4 is an exploded schematic drawing of an embodiment of the present invention.

Referring to FIGS. 1, 2, and 4, a waterproof stabilizer according to a preferred embodiment of the present invention comprises a fixing assembly 1, a rotating assembly 2, circuit boards (not shown) and a waterproof assembly 3, wherein the rotating assembly 2 comprises a first motor 21, a second motor 22, a third motor 23, a first connecting arm 24 and a second connecting arm 25, wherein the first motor 21, the second motor 22, and the third motor 23 are orthogonally arranged in space, a rotor of the first motor 21 is connected with the fixing assembly 1, a stator of the first motor 21 is fixedly connected with a rotor of the second motor 22 via the first connecting arm 24, a stator of the second motor 22 is fixedly connected with a rotor of the third motor 23 via the second connecting arm 25, and the first motor 21, the second motor 22, and the third motor 23 are respectively connected to the circuit board via a connecting base. During using, a video camera or a photo camera may be fixed on the fixing assembly 1. Herein, a pitch angle of the fixing assembly 1 may be controlled by the first motor 21, a roll angle of the fixing assembly 1 may be controlled by the second motor 22, and a yaw angle of the fixing assembly 1 may be controlled by the third motor 23. A first protective case 211 and a first protective cover 212 are arranged on the outside of the first motor 21, a side wall of the first protective case 211 is connected to the first connecting arm 24, the first protective cover 212 is covered on the first protective case, so as to protect the first motor 21 and prevent the first motor 21 from being damaged due to a collision or the like, and meanwhile provide waterproof function for the first motor 21. Similarly, a second protective case 221 and a second protective cover 222 are arranged on the outside of the second motor 22, a side wall of the second protective case 221 is connected to the second connecting arm 25, the second protective cover 222 is covered on the second protective case. In particular, the circuit boards include a first circuit board and a second circuit board, wherein the first circuit board is arranged within the first protective case and for controlling the first motor, and the second circuit board is arranged within the second protective case and for controlling the second motor.

A waterproof assembly 3 comprises a first sealing ring 31, a second sealing ring 32, a third sealing ring 33, a fourth sealing ring 34, a first waterproof plug 36, a second waterproof plug 37, a third waterproof plug 38, a first waterproof layer (not shown), a second waterproof layer (not shown), a third waterproof layer (not shown), and a waterproof membrane (not shown). Herein, the first sealing ring 31 is arranged between the fixing assembly 1 and the rotor of the first motor 21, the second sealing ring 32 is arranged between the first protective case 211 and the first protective cover 212, the third sealing ring 33 is sleeved on a shaft of the second motor 22, the fourth sealing ring 34 is arranged between the second protective case 221 and the second protective cover 222, the first waterproof plug 36 is arranged between the side wall of the first protective case 211 and the first connecting arm 24, the second waterproof plug 37 is arranged between the side wall of the second protective case 221 and the second connecting arm 25, the third waterproof plug 38 is arranged at an end of a shaft of the third motor 23, and a shaft hole of the third motor 23 is plugged by the third waterproof plug 38. Herein, the first waterproof layer is arranged on a surface of the circuit board, the second waterproof layer is covered on the first waterproof layer, the third waterproof layer is covered on the second waterproof layer, and the waterproof membrane is covered on a surface of the connecting base used for connecting the motor and the circuit board, whereby the structural members or connectors of the waterproof stabilizer have better sealing performance and the circuit parts of the waterproof stabilizer have improved water proof function, such that the waterproof stabilizer is water proof and may be applicable to wet or watery environment.

The waterproof stabilizer further comprises a base portion 4. The stator of the third motor 23 is connected to an upper end of the base portion 4. The base portion 4 comprises a casing 46 and a cover plate 47, wherein the cover plate 47 is covered on the casing 46. A USB interface 41 and an indicator light 42 are arranged on a surface of the casing 46. The waterproof assembly further comprises a fifth sealing ring 35, a fourth waterproof plug 39, a casing waterproof membrane 310, and a casing waterproof layer 311, wherein the fifth sealing ring 35 is arranged between the casing 46 and the cover plate 47 so as to avoid water entering the inside of the casing 46 through a gap between the cover plate 47 and the casing 46 and prevent damage to the devices inside the casing 46. The fourth waterproof plug 39 is connected to a surface of the casing 46 and is covered on the USB interface 41, such that the USB interface 41 may be sealed when not in use so as to prevent water from entering into the USB interface 41 to cause damage. Furthermore, the casing waterproof membrane 310 is connected to the casing and covered on the indicator light 42, and the casing waterproof layer 311 is attached to an outer wall of the cover plate 47, thereby further improving water proof performance of the stabilizer. In particular, a Bluetooth® unit is arranged inside the base portion 4, an opening is provided on the outer wall of the cover plate 47 at a position corresponding to the Bluetooth® unit, and the casing waterproof layer 311 is attached to the opening.

In order to allow the waterproof stabilizer to be applied to target objects of various weights or sizes, a position of the second motor 22 may be adjusted to achieve a balance. The first connecting arm 24 is provided with a sliding groove 241 at the end connected with the rotor of the second motor 22, a connecting part 223 is arranged on the rotor of the second motor 22, the rotor of the second motor 22 is slidably connected to the sliding groove 241 via the connecting part 223, such that the second motor 22 is capable of sliding in the direction of the first connecting arm 24. A fastener 2231 is arranged on the connecting part 223 and for fixing the position of the second motor 22 relative to the first connecting arm 24. In particular, the fastener 2231 is a rotating knob externally sleeved on the connecting part 223. In the case that the rotating knob is tightened, the position of the second motor 22 is fixed, and in the case that the rotating knob is loosened, the second motor 22 is capable of sliding in the sliding groove 241.

In order to enable the waterproof stabilizer to carry the target object stably, the fixing assembly 1 comprises a fixing plate 11, a fixing strip 12, and a locking screw 13, wherein the fixing plate 11 is provided with grooves at an upper end and a lower end, and the fixing plate 11 is provided with through holes at the upper end and the lower end, and the fixing strip 12 is provided at an upper end and a lower end with threaded holes corresponding to the through holes of the fixing plate 11. During using, a video camera or a photo camera may be clamped in the grooves and fixed between the fixing plate 11 and the fixing strip 12 by means of the locking screw 13 sequentially extending through the through holes and the threaded holes. Furthermore, the through hole is provided with a cavity 111, in which the locking screw 13 is capable of moving in left and right directions. Accordingly, the fixing strip 12 is capable of moving in left and right directions to make the threaded hole of the strip 12 matching with the locking screw 13, such that the fixing position of the strip 12 relative to the fixing plate 11 can be adjusted and thus the fixing assembly 1 can be applied to cameras of various sizes.

Preferably, the first sealing ring 31, the second sealing ring 32, the third sealing ring 33, the fourth sealing ring 34, the fifth sealing ring 35, the first waterproof plug 36, the second waterproof plug 37, the third waterproof plug 38, and the fourth waterproof plug 39 are made of soft materials. Herein, the first sealing ring 31, the second sealing ring 32, the third sealing ring 33, the fourth sealing ring 34, and the fifth sealing ring 35 are O-shaped.

The casing waterproof membrane 310 is made of transparent materials, so as to reduce the effects of the waterproof membrane 310 on the reduction of the brightness of the indicator light 42.

Figure 3:
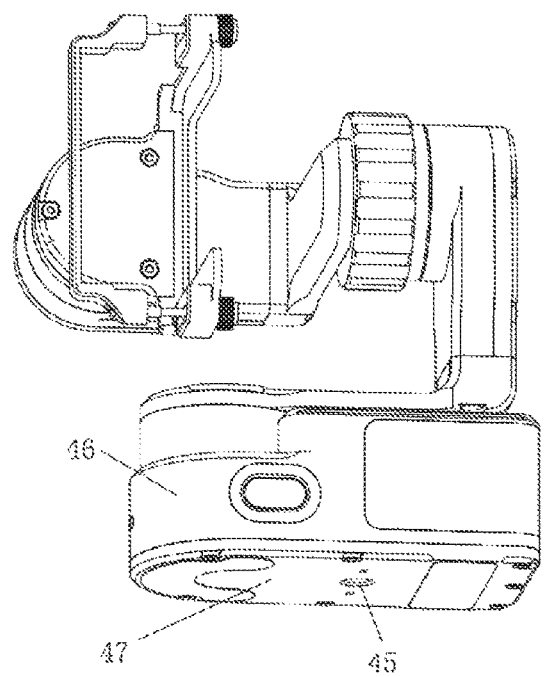
FIG. 3 is a third schematic drawing of an embodiment of the present invention.

The base portion 4 further comprises a control panel and key interface 43 to enable function operations through the base portion 4. In order to allow the base portion 4 to be mounted somewhere else, the base portion 4 is provided with a mounting portion. In particular, as shown in FIG. 3, a first mounting portion 44 is provided on a sidewall of the base portion 4, and a second mounting portion 45 is provided on the bottom of the base portion 4. Preferably, the first mounting portion 44 and the second mounting portion 45 are ¼ threaded holes. During using, the part where the base portion to be mounted may be provided with a threaded hole or a screw matching with the ¼ threaded hole, whereby the base portion 4 may be mounted and fixed.

Figure 5:
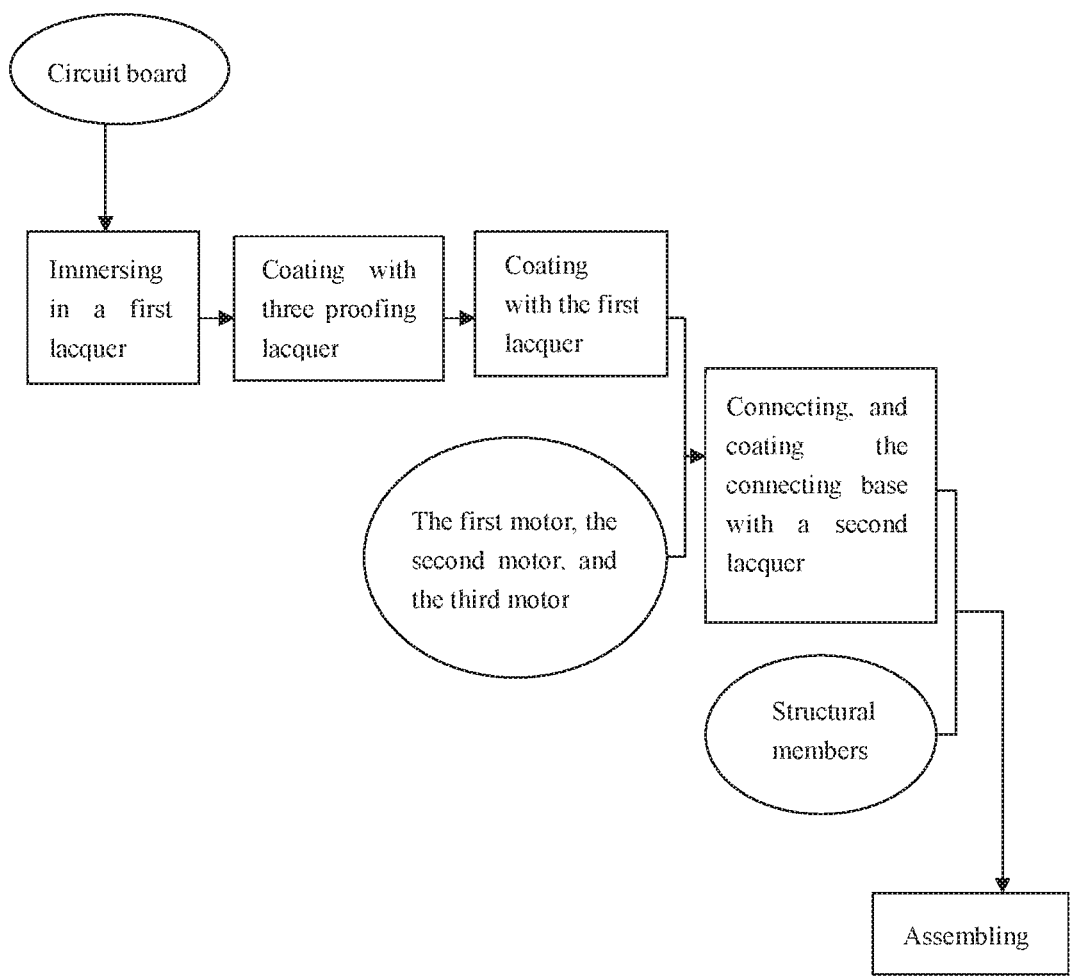
FIG. 5 shows steps of a waterproofing method of an embodiment of the present invention.

A waterproofing method of a waterproof stabilizer comprises providing the waterproof assembly 3 as mentioned above. Herein, referring to FIG. 5, a first waterproof layer, a second waterproof layer, a third waterproof layer, and a waterproof membrane are provided by the following method.

Immersing the circuit board in a first lacquer for ten minutes, then taking it out from the first lacquer and drying it for five hours to form a first waterproof layer on a surface of the circuit board;

Coating a surface of the first waterproof layer with three-proofing lacquer, to form a second waterproof layer covered on the surface of the first waterproof layer after the curing of the three-proofing lacquer;

Coating a surface of the second waterproof layer with the first lacquer, to form a third waterproof layer covered on the surface of the second waterproof layer after the curing of the first lacquer;

Connecting the first motor 21, the second motor 22 and the third motor 23 with the circuit board, which is arranged with the first waterproof layer, the second waterproof layer and the third waterproof layer, via the connecting base, respectively, and meanwhile coating a surface of the connecting base with a second lacquer, to form a waterproof membrane covered on the surface of the connecting base after the curing of the second lacquer.

After connecting the first motor 21, the second motor 22 and the third motor 23 with the circuit board, sequentially assembling the fixing assembly 1, the rotating assembly 2, and other components of the waterproof assembly 3 together.

Preferably, the first lacquer is thick, and when the first lacquer is not cured, it forms an oil film capable of isolating water molecules. The second lacquer is made of transparent liquid materials, and after the second lacquer is cured, it forms a water-resistant thin film.

To sum up, in the waterproof stabilizer according to the present invention, the first motor, the second motor and the third motor are orthogonally arranged in space, the rotor of the first motor is connected with the fixing assembly, the first connecting arm has one end connected with the stator of the first motor and the other end connected with the rotor of the second motor, the second connecting arm has one end connected with the stator of the second motor and the other end connected with the rotor of the third motor, and the first motor, the second motor, and the third motor are respectively connected to the circuit board via a connecting base. Herein, the first protective case and the first protective cover are arranged on the outside of the first motor, and the second protective case and the second protective cover are arranged on the outside of the second motor. The first sealing ring is arranged between the fixing assembly and the rotor of the first motor, the second sealing ring is arranged between the first protective case and the first protective cover, the third sealing ring is sleeved on the shaft of the second motor, the fourth sealing ring is arranged between the second protective case and the second protective cover, the first waterproof plug is arranged between the first protective case and the first connecting arm, the second waterproof plug is arranged between the second protective case and the second connecting arm, the third waterproof plug is arranged at one end of the shaft of the third motor, and the shaft hole of the third motor is plugged by the third waterproof plug. The first waterproof layer, the second waterproof layer and the third waterproof layer are sequentially arranged on the surface of the circuit board, and the waterproof membrane is arranged on the surface of the connecting base, whereby the structural members and connectors of the waterproof stabilizer have better sealing performance and the circuit parts of the waterproof stabilizer have improved water proof function, such that the waterproof stabilizer can be water proof and can be applicable to wet or watery environment.

All the above are merely the preferred embodiments of the present invention. It should be noted that, those skilled in the art may change or modify the above disclosed technical contents to obtain equivalent embodiments without departing from the principle and scope of the present invention. The present invention is intended to cover all changes and equivalent arrangements included within the principle and scope of the present invention.

What is claimed is:

1. A waterproof stabilizer, comprising: a fixing assembly, a rotating assembly, a circuit board and a waterproof assembly, wherein the rotating assembly comprises a first motor, a second motor, a third motor, a first connecting arm and a second connecting arm, wherein the first motor, the second motor and the third motor are orthogonally arranged in space, a rotor of the first motor is connected with the fixing assembly, a stator of the first motor is fixedly connected with a rotor of the second motor via the first connecting arm, a stator of the second motor is fixedly connected with a rotor of the third motor via the second connecting arm, and the first motor, the second motor and the third motor are respectively connected to the circuit board via a connecting base;

a first protective case and a first protective cover are arranged on an outside of the first motor, a side wall of the first protective case is connected to the first connecting arm, and the first protective cover is covered on the first protective case; a second protective case and a second protective cover are arranged on an outside of the second motor, a side wall of the second protective case is connected to the second connecting arm, and the second protective cover is covered on the second protective case;

a waterproof assembly comprises a first sealing ring, a second sealing ring, a third sealing ring, a fourth sealing ring, a first waterproof plug, a second waterproof plug, a third waterproof plug, a first waterproof layer, a second waterproof layer, a third waterproof layer, and a waterproof membrane;

wherein the first sealing ring is arranged between the fixing assembly and the rotor of the first motor;

the second sealing ring is arranged between the first protective case and the first protective cover;

the third sealing ring is sleeved on a shaft of the second motor;

the fourth sealing ring is arranged between the second protective case and the second protective cover;

the first waterproof plug is arranged between the side wall of the first protective case and the first connecting arm;

the second waterproof plug is arranged between the side wall of the second protective case and the second connecting arm;

the third waterproof plug is arranged at an end of a shaft of the third motor, and a shaft hole of the third motor is plugged by the third waterproof plug;

the first waterproof layer is arranged on a surface of the circuit board, the second waterproof layer is covered on the first waterproof layer, and the third waterproof layer is covered on the second waterproof layer; and the waterproof membrane is covered on a surface of the connecting base.

2. The waterproof stabilizer according to claim 1, further comprising a base portion, the stator of the third motor is connected to an upper end of the base portion, wherein the base portion comprises a casing and a cover plate covered on the casing, a USB interface and an indicator light are arranged on a surface of the casing, wherein the waterproof assembly further comprises a fifth sealing ring, a fourth waterproof plug, a casing waterproof membrane and a casing waterproof layer, wherein the fifth sealing ring is arranged between the casing and the cover plate, the fourth waterproof plug is connected to a surface of the casing and is covered on the USB interface, the casing waterproof membrane is connected to the casing and covered on the indicator light, and the casing waterproof layer is attached to an outer wall of the cover plate.

3. The waterproof stabilizer according to claim 1, characterized in that: the first connecting arm is provided with a sliding groove at the end connected with the rotor of the second motor, the rotor of the second motor is arranged with a connecting part via which the rotor of the second motor is slidably connected to the sliding groove, and the connecting part is arranged with a fastener for fixing the position of the second motor relative to the first connecting arm.

4. The waterproof stabilizer according to claim 3, characterized in that: the fastener is a rotating knob externally sleeved on the connecting part.

5. The waterproof stabilizer according to claim 1, characterized in that: the fixing assembly comprises a fixing plate, a fixing strip and a locking screw, wherein the fixing plate is provided at an upper end and a lower end with a groove for receiving an object, the fixing plate is provided at the upper end and the lower end with a through hole, the fixing strip is provided at an upper end and a lower end with a threaded hole corresponding to the through hole, and the locking screw sequentially extends through the through hole and the threaded hole to fix the object between the fixing plate and the fixing strip.

6. The waterproof stabilizer according to claim 2, characterized in that: the first sealing ring, the second sealing ring, the third sealing ring, the fourth sealing ring, the fifth sealing ring, the first waterproof plug, the second waterproof plug, the third waterproof plug, and the fourth waterproof plug are made of soft materials.

7. The waterproof stabilizer according to claim 1, characterized in that: the sealing rings are O-shaped.

8. The waterproof stabilizer according to claim 2, characterized in that: the waterproof membrane is made of transparent materials.

9. A waterproofing method of a waterproof stabilizer according to claim 1, comprising following steps:
immersing a circuit board in a first lacquer for ten minutes, then drying the circuit board for five hours to form a first waterproof layer on a surface of the circuit board;
coating a surface of the first waterproof layer with three-proofing lacquer to form a second waterproof layer;
coating a surface of the second waterproof layer with the first lacquer to form a third waterproof layer;
respectively connecting a first motor, a second motor and a third motor with the circuit board via a connecting base, and meanwhile coating a surface of the connecting base with a second lacquer to form a waterproof membrane covered on the surface of the connecting base.

10. The waterproofing method of the waterproof stabilizer according to claim 9, characterized in that: the first lacquer is thick, and it forms an oil film when it is not cured, and the second lacquer is made of transparent liquid materials, and it forms a water-resistant thin film after being cured.

* * * * *